US011982174B2

(12) United States Patent
Anifowose et al.

(10) Patent No.: US 11,982,174 B2
(45) Date of Patent: May 14, 2024

(54) METHOD FOR DETERMINING PORE PRESSURES OF A RESERVOIR

(71) Applicant: SAUDI ARABIAN OIL COMPANY, Dhahran (SA)

(72) Inventors: Fatai A. Anifowose, Al-Khobar (SA); Mokhles M. Mezghani, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 11 days.

(21) Appl. No.: 17/643,551

(22) Filed: Dec. 9, 2021

(65) Prior Publication Data
US 2023/0184084 A1 Jun. 15, 2023

(51) Int. Cl.
E21B 45/00 (2006.01)
E21B 43/34 (2006.01)
(Continued)

(52) U.S. Cl.
CPC .............. E21B 45/00 (2013.01); E21B 43/34 (2013.01); E21B 47/06 (2013.01); E21B 49/003 (2013.01);
(Continued)

(58) Field of Classification Search
CPC .......... E21B 45/00; E21B 43/34; E21B 47/06; E21B 49/003; E21B 2200/20;
(Continued)

(56) References Cited

U.S. PATENT DOCUMENTS 5,615,115 A * 3/1997 Shilling ................ E21B 49/006
702/9
10,400,590 B1 * 9/2019 Aldred .................... E21B 49/00
(Continued)

FOREIGN PATENT DOCUMENTS

WO 2016/134376 A1 8/2016

OTHER PUBLICATIONS

A.D.Dongrae and et al, "Introduction to Artificial Neural Network", International Journal of Engineering and Innovative Technology (IJEIT) vol. 2, Issue 1, Jul. 2012 (Year: 2012).*
(Continued)

Primary Examiner — Douglas Kay
(74) Attorney, Agent, or Firm — Osha Bergman Watanabe & Burton LLP

(57) ABSTRACT

A method for determining a real-time pore pressure log of a well in a reservoir, including the steps: storing existing data logs of surface drilling parameters, logging while drilling (LWD), and mud gas of existing wells in a database, storing existing pore pressure logs of the existing wells in the database, wherein the existing pore pressure logs correspond to the existing data logs, determining a relationship between the existing data logs and the existing pore pressure logs, drilling a new well into the reservoir, determining new data logs of surface drilling parameters, LWD, and mud gas of the new well while drilling the new well, inputting the new data logs of the new well into the relationship while drilling the new well, determining a real-time pore pressure log of the new well by outputting an estimated pore pressure at a certain depth by the relationship while drilling the new well.

18 Claims, 6 Drawing Sheets

(51) Int. Cl.
*E21B 47/06* (2012.01)
*E21B 49/00* (2006.01)
*G01V 5/04* (2006.01)
*G06N 3/048* (2023.01)
*G06N 3/08* (2023.01)

(52) U.S. Cl.
CPC .............. *G01V 5/04* (2013.01); *G06N 3/048* (2023.01); *G06N 3/08* (2013.01); *E21B 2200/20* (2020.05); *E21B 2200/22* (2020.05)

(58) Field of Classification Search
CPC ...... E21B 2200/22; G01V 5/04; G06N 3/048; G06N 3/08
See application file for complete search history.

(56) References Cited

U.S. PATENT DOCUMENTS

| | | | | |
|---|---|---|---|---|
| 11,222,254 | B2* | 1/2022 | Carbon | G06N 3/063 |
| 2006/0093523 | A1* | 5/2006 | Norman | G01N 33/2823 436/25 |
| 2009/0157367 | A1* | 6/2009 | Meyer | E21B 7/04 703/10 |
| 2010/0268074 | A1* | 10/2010 | Van Loef | A61B 6/037 250/269.1 |
| 2013/0341093 | A1* | 12/2013 | Jardine | E21B 7/00 703/2 |
| 2014/0116776 | A1 | 5/2014 | Marx et al. | |
| 2016/0097270 | A1 | 4/2016 | Pobedinski et al. | |
| 2016/0222741 | A1 | 8/2016 | Lovorn et al. | |
| 2017/0132339 | A1 | 5/2017 | Umholtz et al. | |
| 2017/0260855 | A1* | 9/2017 | Yang | E21B 49/005 |
| 2017/0268333 | A1* | 9/2017 | Pickell | G01N 1/22 |
| 2018/0017691 | A1 | 1/2018 | Dirksen et al. | |
| 2018/0340410 | A1* | 11/2018 | Rivera-Rios | E21B 44/00 |
| 2019/0169986 | A1 | 6/2019 | Storm, Jr. et al. | |
| 2019/0187116 | A1* | 6/2019 | Mauborgne | G01V 5/108 |
| 2019/0236439 | A1* | 8/2019 | D | G06F 9/5077 |
| 2020/0308963 | A1* | 10/2020 | Dröge | E21B 21/067 |
| 2020/0378248 | A1* | 12/2020 | Maus | E21B 7/04 |
| 2021/0256542 | A1* | 8/2021 | McDaniel | G06V 40/174 |
| 2021/0333270 | A1* | 10/2021 | Mann | G16B 25/30 |
| 2021/0388714 | A1* | 12/2021 | Katterbauer | G06N 5/046 |
| 2022/0268229 | A1* | 8/2022 | Timofejevs | G06N 3/065 |
| 2022/0280072 | A1* | 9/2022 | Timofejevs | G06N 3/0464 |

OTHER PUBLICATIONS

R. M. Neal, "Bayesian Training of Backpropagation Networks by the Hybrid Monte Carlo Method", Technical report CRG-TR-92-1, Department of Computer Science, University of Toronto, 1992 (Year: 1992).*

Y. Kassa and et al, "Short Term Wind Power Prediction Using ANFIS", 2016 IEEE International Conference on Power and Renewable Energy (Year: 2012).*

A. Abdelaal and et al, "Pore Pressure Estimation While Drilling Using Machine Learning", ARMA/DGS/SEG International Geomechanics Symposium, Nov. 1-4, 2021 (Year: 2021).*

Hadi, Farqad, and et al. "Real-time pore pressure prediction in depleted reservoirs using regression analysis and artificial neural networks." In SPE Middle East Oil and Gas Show and Conference, p. D031S034R002. SPE, 2019 (Year: 2019).*

Liu, Yukun, and et al. "A new quantitative model and application for overpressure prediction in carbonate formation." Journal of Petroleum Science and Engineering 198 (2021): 108145 (Year: 2021).*

Farid ArabAmeri et al., "Enhanced velocity-based pore-pressure prediction using lithofacies clustering: a case study from a reservoir with complex lithology in Dezful Embayment, SW Iran" Journal of Geophysics and Engineering, vol. 16, Issue 1, p. 146-158, 2019 (13 pages).

Abdulmalek Ahmed et al., "New Model for Pore Pressure Prediction While Drilling Using Artificial Neural Networks", Arabian Journal for Science and Engineering, vol. 44, pp. 6079-6088, 2019 (10 pages).

P S Hutomo et al., "Pore Pressure Prediction Using Eaton and Neural Network Method in Carbonate Field "X" Based on Seismic Data", IOP Conference Series: Materials Science and Engineering, vol. 546, Issue 3, pp. 1-7, 2019 (8 pages).

Farqad Hadi et al., Real-Time Pore Pressure Prediction in Depleted Reservoirs Using Regression Analysis and Artificial Neural Networks, Society of Petroleum Engineers, 2019 (14 pages).

N. Dutta et al, "Geopressure Detection and Prediction in Real Time", Quantitative Analysis of Geopressure for Geoscientists and Engineers, Cambridge University Press, pp. 348-367, 2021 (20 pages).

Morteza Azadpour et al., "Pore Pressure Prediction and Modeling using Well-Logging Data in One of the Gas Fields in South of Iran", Journal of Petroleum Science and Engineering, vol. 128, pp. 15-23, 2015 (9 pages).

Libin Liu et al., "Abnormal Formation Velocities and Applications to Pore Pressure Prediction", Journal of Applied Geophysics, vol. 153, pp. 1-6, 2018 (6 pages).

Yukun Liu et al., "A New Quantitative Model and Application for Overpressure Prediction in Carbonate Formation", Journal of Petroleum Science and Engineering, vol. 198, 2021 (15 pages).

Mohammad Farsi et al., "Predicting Formation Pore-Pressure from Well-Log Data with Hybrid Machine-Learning Optimization Algorithms", Natural Resources Research, 2021 (27 pages).

* cited by examiner

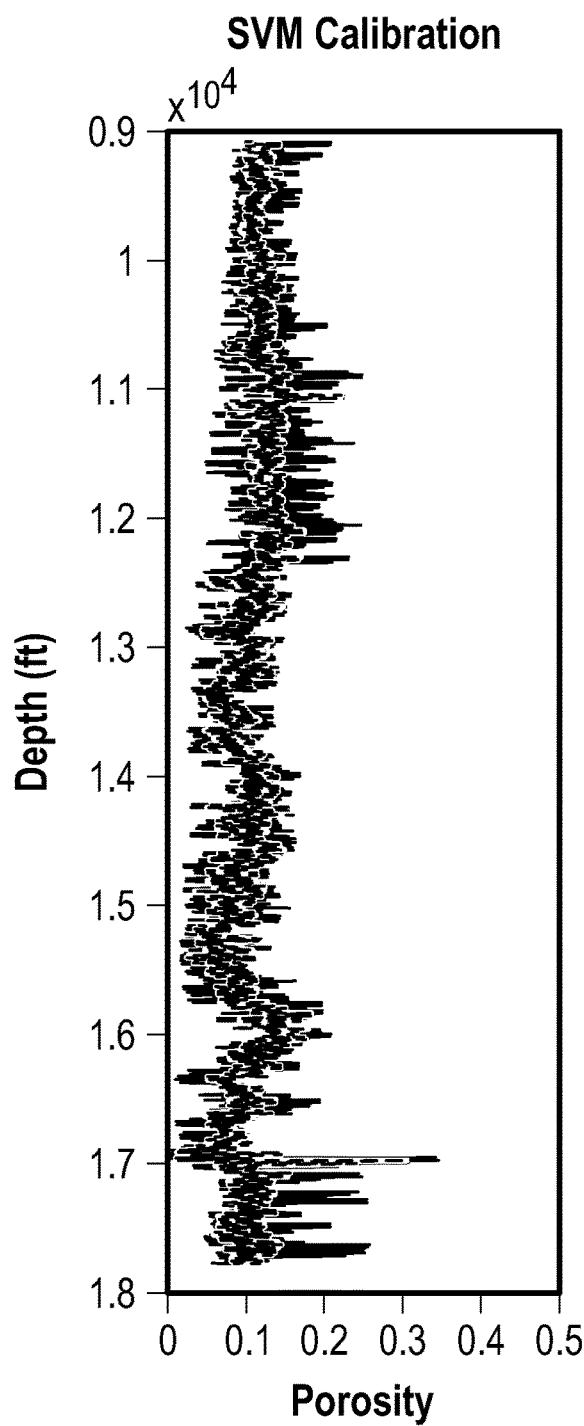 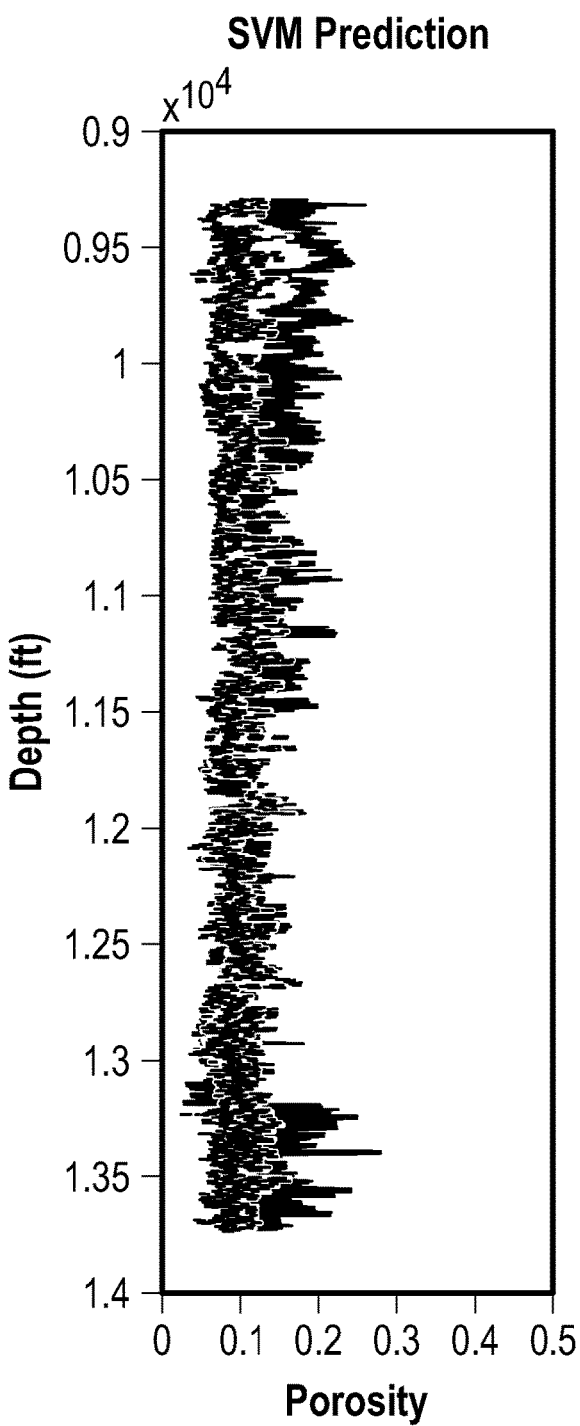
FIG. 5A
FIG. 5B

METHOD FOR DETERMINING PORE PRESSURES OF A RESERVOIR

BACKGROUND

A reservoir rock is a formation below the earth that has pores for storing fluids. The pores of the reservoir rock are permeable for transmitting the fluids. The pore pressure in a porous formation is the pressure of the fluids in the pores and is exerted by a column of fluid from the depth of the formation to sea level. The pore pressure is not necessarily equal to the hydrostatic pressure of the formation.

Estimating the pore pressure becomes essential, when drilling wells into the formation. The pore pressure has three pressure levels: normal pressure, underpressure, and overpressure. The pressure level is at normal pressure when the pore pressure is equal to the hydrostatic pressure of the formation. The pressure level is at underpressure when the pore pressure is lower than the hydrostatic pressure of the formation. The pressure level is at overpressure when the pore pressure is higher than the hydrostatic pressure of the formation.

The hydrostatic pressure of the formation is usually at a pressure level equal to the normal pressure of the pore pressure. Both pressure levels of underpressure and overpressure are considered abnormal. Several mechanisms such as compaction disequilibrium, hydrocarbon generation and gas cracking, hydrothermal expansion, tectonic compression (lateral stress), mineral transformations such as illitization, and osmosis, hydraulic head, and hydrocarbon buoyancy cause abnormal pore pressure levels. Abnormal pressure levels of pore pressures, especially overpressures, greatly make the drilling time non-productive and cause serious drilling incidents, such as blowouts, kicks, fluid influx, pipe sticking, and lost circulation. To avoid such incidents, the pore pressure needs to be accurately estimated and closely monitored while drilling wells. Knowing the pore pressure while drilling helps to dynamically adjust the mud weight to stabilize the hydrostatic pressure, thereby preserving the integrity of the well and ensuring an efficient drilling process.

Accordingly, there exists a need for a method to determine an accurate estimation of the pore pressure while drilling wells.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for determining a real-time pore pressure log of a well in a reservoir, comprising the steps: storing existing data logs of surface drilling parameters, logging while drilling (LWD), and mud gas of existing wells in a database, storing existing pore pressure logs of the existing wells in the database, wherein the existing pore pressure logs correspond to the existing data logs, determining a relationship between the existing data logs and the existing pore pressure logs, drilling a new well into the reservoir, determining new data logs of surface drilling parameters, LWD, and mud gas of the new well while drilling the new well, inputting the new data logs of the new well into the relationship while drilling the new well, determining a real-time pore pressure log of the new well by outputting an estimated pore pressure at a certain depth by the relationship while drilling the new well.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIG. 5a illustrates a first pair of data logs of porosity derived from mud gas.

FIG. 5b illustrates a second pair of data logs of porosity derived from mud gas.

DETAILED DESCRIPTION

In general, embodiments disclosed herein relate to a method for determining pore pressures of a reservoir that optimally uses all the abundant data collected during drilling: mud gas data acquired directly from the well and measured at the surface after separation of the gas components, Logging While Drilling (LWD) measured directly from the well and transmitted to the surface, and the surface drilling parameters. Advantageously, embodiments of the present disclosure make it possible to dynamically adjust the weight on the drill bit during the drilling of the well once the real-time pore pressure log is available. Dynamically adjusting the weight on the drill bit prevents various drilling issues, such as blowout, gas kicks, stuck pipe, fluid influx, and lost circulation. On the other hand, the safety and drilling efficiency increases. Furthermore, the properties of the drilling mud, such as density and rheology are dynamically adjusted as well, thereby increasing rate of penetration.

The real-time pore pressure log is also very essential for the control of the geosteering of the well. Geosteering is used to position the drill bit or drill string of the drilling system relative to a boundary between different subsurface layers (e.g., overlying, underlying, and lateral layers of a pay zone) during drilling operations. In particular, measuring rock properties during drilling provides the drilling system with the ability to steer the drill bit in the direction of desired hydrocarbon concentrations. As such, a geosteering system uses various well sensors located inside or adjacent to the drill string to determine different rock formations within a well path. In some geosteering systems, drilling tools use resistivity or acoustic measurements to guide the drill bit during horizontal or lateral drilling. Likewise, a well path of a wellbore is updated by a control system using a geological model. For example, a control system communicates geosteering commands to the drilling system based on well data updates that are further adjusted by the reservoir simulator using a geological model. As such, the control system generates one or more control signals for the drilling equipment, or a logging system generates control signals for the logging equipment, based on an updated well path design and/or a geological model.

The real-time pore pressure log also helps to dynamically determine optimal casing points of the well during the drilling. The real-time pore pressure log is also important for dynamically detecting zones of poor quality of LWD measurements and zones of hydrocarbon existence. Embodiments disclosed herein determine pore pressures of a reservoir to estimate accurate and highly confident pore pressures as a log for real-time and on-time decisions while drilling to increase safety and improve drilling efficiency.

Figure 1:
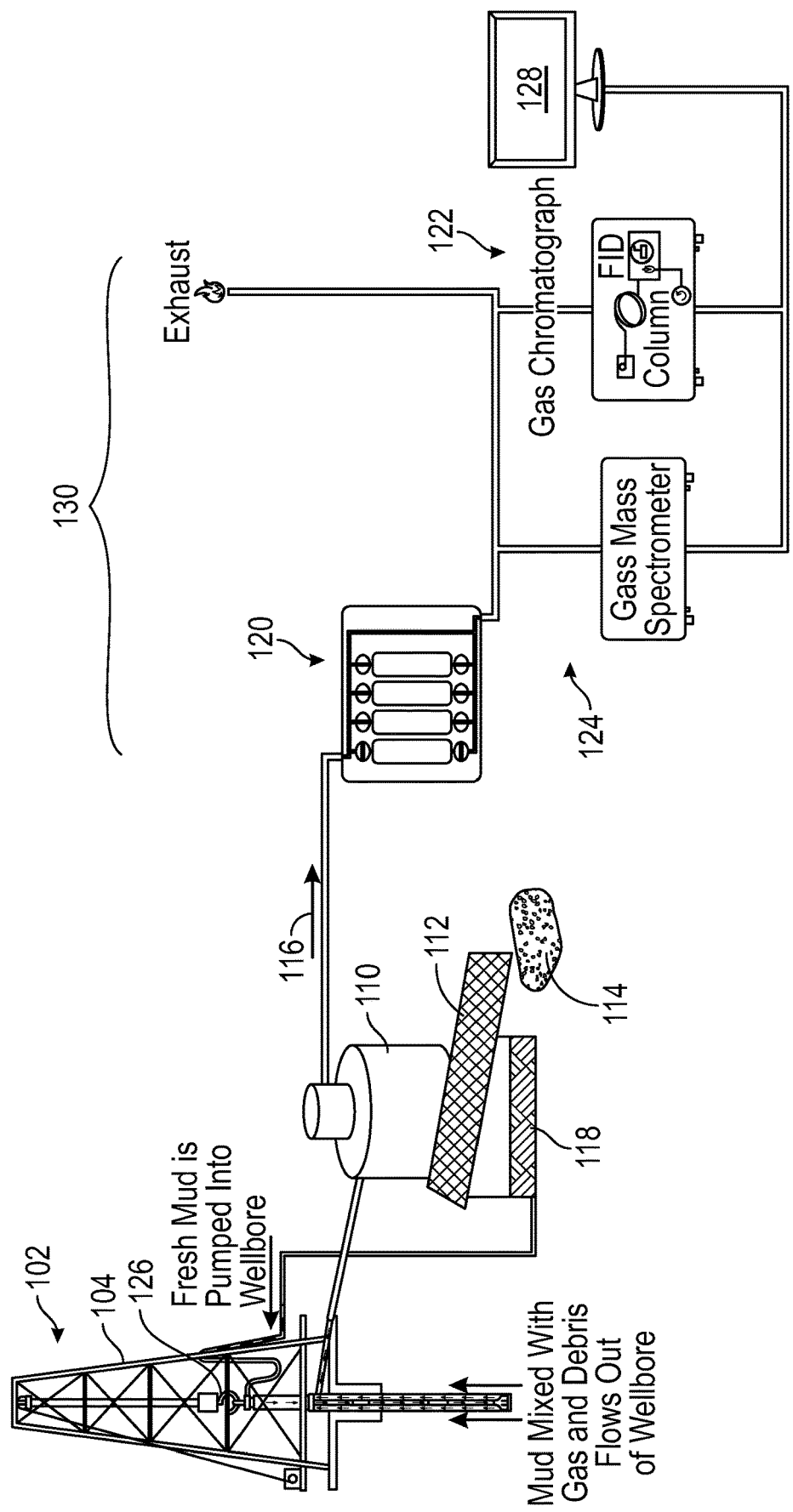
FIG. 1 illustrates a system for determining a pore pressure log of a well in a reservoir according to one or more embodiments.

FIG. 1 illustrates a system for data acquisition to determine a pore pressure log of a well in a reservoir according to one or more embodiments. The system comprises a drilling rig 102, a logging unit 130, and a ML engine 128.

The drilling rig 102 comprises a mast 104, drawworks, a top drive, a drill string, a mud tank 118, a mud pump, and a power generator. The mast 104 carries the drill string on a hook 126. The power generator turns the drill string via the drawworks. The drill string comprises a drill pipe and a drill bit, wherein the drill pipe is above the drill bit. Turning the drill string turns the drill bit. The drawworks are then lowered to the ground and the drill bit drills a well into the formation. Well sensors are attached to the drill string. The well sensors measure the LWD data as a function of the depth during the drilling of the well. The measured LWD data as function of the depth of the well determines the log data of the LWD. Furthermore, the mast 104 comprises various surface sensors. The Surface sensors measure the surface drilling parameters as a function of the depth of the well during the drilling of the well.

During the drilling, the surface sensors measure and monitor the surface drilling parameters. In one or more embodiments, the surface drilling parameters are rate of penetration (ROP), weight of the drill bit (WOB), torque, revolutions per minute (RPM) of the drill bit, hook load, mud flow rate, D-Exponent, mud density, standpipe pressure, and mud temperature. The well sensors measure the LWD data representing the formation. In one or more embodiments, the LWD data comprise various physical parameters, such as sound, gamma, and neutron ray emissions which comprise gamma ray, sonic, resistivity, and neutron porosity.

The D-Exponent comprises the differential pressure effect in normalizing a rate of penetration from drilling parameters:

$$D = \frac{\log\left(\frac{R}{60N}\right)}{\log\left(\frac{12W}{10^6 B}\right)} * \left(\frac{\rho_{normal}}{\rho_{actual}}\right),$$

where R is the rate of penetration (ROP) in ft/h, N is the rounds per minute (RPM) of the drill bit, B is the diameter of the drill bit in inches, W is the weight of the drill bit (WOB), $\rho_{normal}$ is the normal hydrostatic gradient in ppg, and $\rho_{actual}$ is the current mud weight in ppg.

During the drilling of the well, the drill bit becomes hot, builds pressure inside the formation, and produces drill cuttings and other debris. Therefore, mud is pumped down the well to the formation through the drill pipe with high pressure. The mud lubricates the drill bit, neutralizes pressure of the formation, and conveys drill cuttings and the other debris from the well to the surface.

The mud is mixed with gasses from the well to a mud gas and the mud gas flows out of the well being drilled. The mud gas 116 is a mixture of gasses that are dissolved or suspended in the mud. The mud gas 116 comprises light gasses like C1 to C5 and heavy gasses like benzene, toluene, helium, and methylcyclohexane.

The circulated mud is collected at the surface in a separator tank 110 where the mud is degassed by an agitator. The degassed mud flows over a shale shaker 112 where the cuttings 114 and the other debris are conveyed away. The filtered mud is collected in the mud tank 118 to be pumped back to the well. The gas mixture extracted from the mud is conveyed through a vacuum pipeline to a logging unit 130 for analysis.

The logging unit 130 comprises a gas sampler 120, a chromatograph 122, and a spectrometer 124. The spectrometer 124 separates and measures the different components of the gas ranging from light gasses like methane C1, ethane C2, carbon disulfide C2S, propane C3, iso butane iC4, normal butane nC4, iso pentane iC5, and normal pentane nC5 to the heavy gases like benzene, toluene, helium, and methylcyclohexane as well as organic gases like all the aforementioned gases and inorganic gases like carbon dioxide CO2, hydrogen H2, hydrogen sulfide H2S. The gas chromatograph 122 and the gas spectrometer 124 measure the chemical composition of the gases after they have been separated. The gas chromatograph 122 measures the individual components of the light gases while the gas spectrometer 124 measures the heavy components of the gases. Measurements are typically made in part per million (ppm) of the respective gas components.

The chemical composition of the gases (mud gas data) together with the LWD data and the surface drilling parameters is then inputted into a machine learning (ML) engine to determine an estimated pore pressure log of a well in the reservoir. The ML engine outputs the real-time pore pressure log of the well in the reservoir on a monitor 128. The ML engine for performing the method for determining a real-time pore pressure log of a well in a reservoir is illustrated in FIG. 2.

Figure 2:
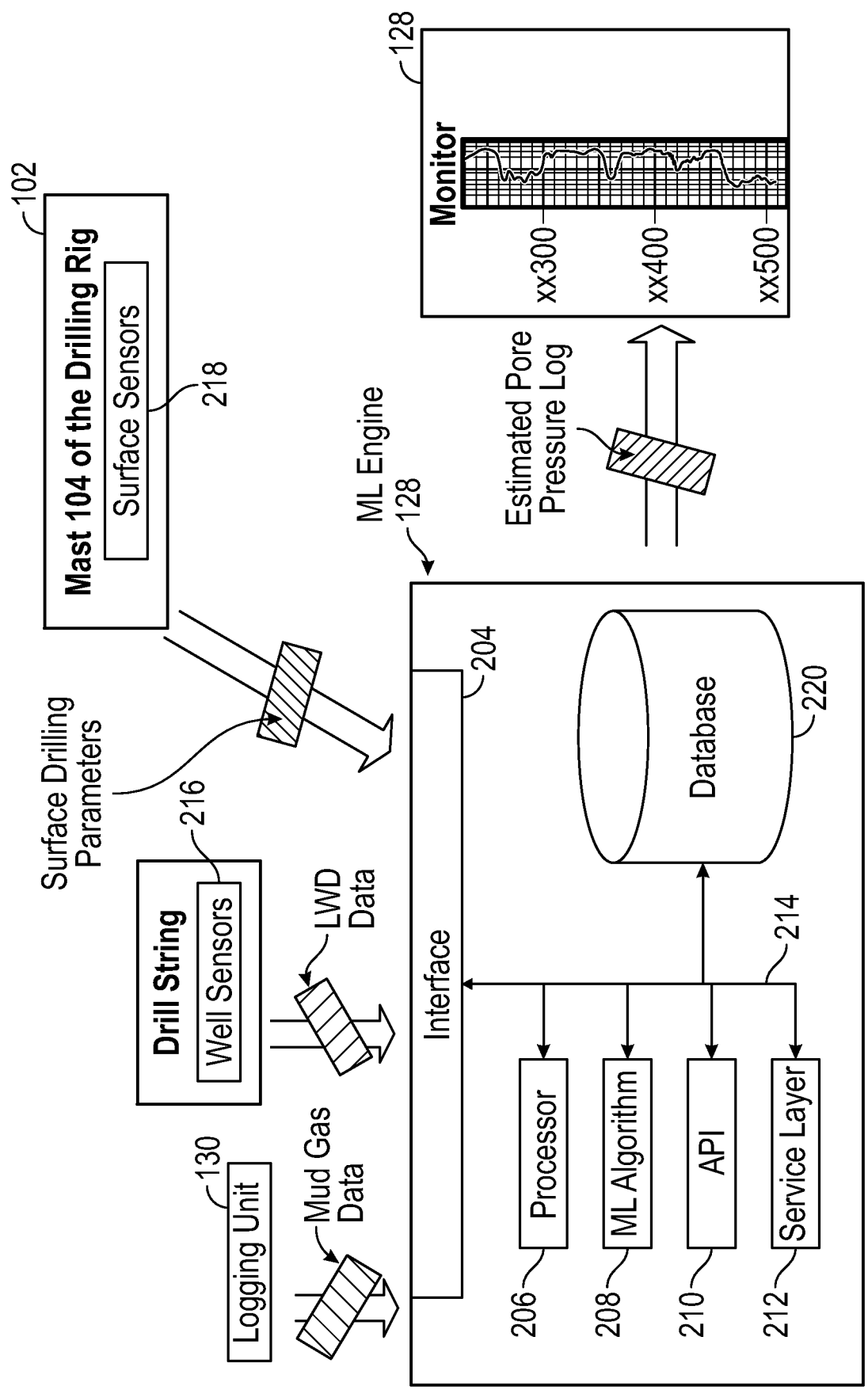
FIG. 2 illustrates an machine learning (ML) engine according to one or more embodiments.

FIG. 2 illustrates the ML engine 208 for performing the method for determining a real-time pore pressure log of a well in a reservoir. In one or more embodiments, the ML engine 208 is a high performance computing (HPC) device, server, desktop computer, laptop/notebook computer, wireless data port, smart phone, personal data assistant (PDA), tablet computing device, one or more computer processors within these devices, or any other suitable processing device, comprising both physical or virtual instances (or both) of the computing device. Additionally, the ML engine 208 comprises a computer that comprises an input device, such as a keypad, keyboard, touch screen, or other device that can accept user information, and an output device that conveys information associated with the operation of the ML engine 208, comprising digital data, visual, or audio information (or a combination of information), or a GUI.

The ML engine 208 also comprises an interface 204. The interface 204 comprises software supporting one or more communication protocols. The interface 204 further comprises hardware that receives physical signals within and outside of the illustrated ML engine 208.

The interface 204 receives the surface drilling parameters from surface sensors 218, the LWD data from well sensors 216, and the mud gas data from the logging unit 130. In one or more embodiments, the interface 204 is wirelessly connected to the surface sensors 218, well sensors 216, and the logging unit 130. In other embodiments, the interface 204 comprises a wired connection to the surface sensors 218, well sensors 216, and the logging unit 130.

Furthermore, the ML engine 208 comprises one or more ML algorithms 208 for performing the method steps for determining a real-time pore pressure log of a well in a reservoir. The ML algorithm 208 is a software component of the ML engine 208. Although illustrated as an internal part of the ML engine 208, in alternative embodiments, the ML algorithm 208 is an external component of the ML engine 208.

The ML engine 208 comprises a processor 206. The processor 206 executes instructions according to the ML algorithm 208 and manipulates data logs received from the surface sensors 218, well sensors 216, and the logging unit 130 to perform the method steps for determining a real-time pore pressure log of a well in a reservoir according to the ML algorithm 208.

The ML engine 208 further comprises a database 220. The existing data logs of surface drilling parameters, LWD, mud gas and the existing pore pressure logs are stored in the database 220. While the database 220 is illustrated as an integral component of the ML engine 208, in alternative embodiments, the database 220 is external to the ML engine 208. The database 220 may be any repository capable of storing data, including but not limited to data structures such as tables, lists, arrays, etc.

The interface 204, the processor 206, the ML algorithm 208, and the database 220 communicate via a system bus 214. In one or more embodiments, any or all of the interface 204, the processor 206, the ML algorithm 208, and the database 220, communicate with each other over the system bus 214 using an application programming interface (API) 210 or a service layer 212 or a combination of the API 210 and service layer 212.

In one or more embodiments, the ML algorithm creates a ML model with an artificial neural network (ANN). The ANN comprises neurons, wherein each neuron is connected to every other neuron in the ANN. A neuron receives data then processes it and sends the data to all the other neurons. The neurons are aggregated and organized into layers. The neurons of a layer are connected to all the neurons of the neighboring layers. A first layer is the input layer that receives the existing data logs. The last layer is the output layer that outputs the estimated pore pressure log.

For the further discussion, it is assumed that the ML engine uses an ANN. The ANN creates a mathematical nonlinear relationship between existing data logs (training data subset) from existing wells and existing pore pressure logs that correspond to the existing data logs from the same existing wells.

The ANN uses an activation function $f$ as the nonlinear relationship to multiply each data of the training data subset with a certain weighting factor determined by the outcome of the nonlinear relationship. The weighting factor determines the effect of each data of the training data subset on the output of the nonlinear relationship of the ML model.

The weighting factors are determined by a propagation function of the ANN that calculates the input to a neuron from the outputs of its predecessor neurons and their connections as a weighting factor. The weighting factor is then inputted in the activation function $f$ to output the estimated pore pressure.

The activation function $f$ is high-dimensional and non-linear to estimate the pore pressure $PP=f(\alpha_1 X_1+\alpha_2 X_2+ \ldots +\alpha_6 X_6)$, where $\alpha_1, \alpha_2, \ldots \alpha_6$ are the weighting factors and $X_1, X_2, \ldots X_6$ are the training data subsets. In one or more embodiments, the activation function $f$ is a Gaussian function $f=e^{-x^2}$, where x is each of the input data logs. In other embodiments, the activation function $f$ is a sigmoid function $$f = \frac{1}{1+e^{-x}},$$

where x is each of the input data logs.

The ANN further comprises a summation layer that uses a linear function.

The ANN further comprises hyperparameters (learning parameters) which are set before the learning of the ANN begins. The learning parameters then change with learning progress of the ANN.

Figure 3:
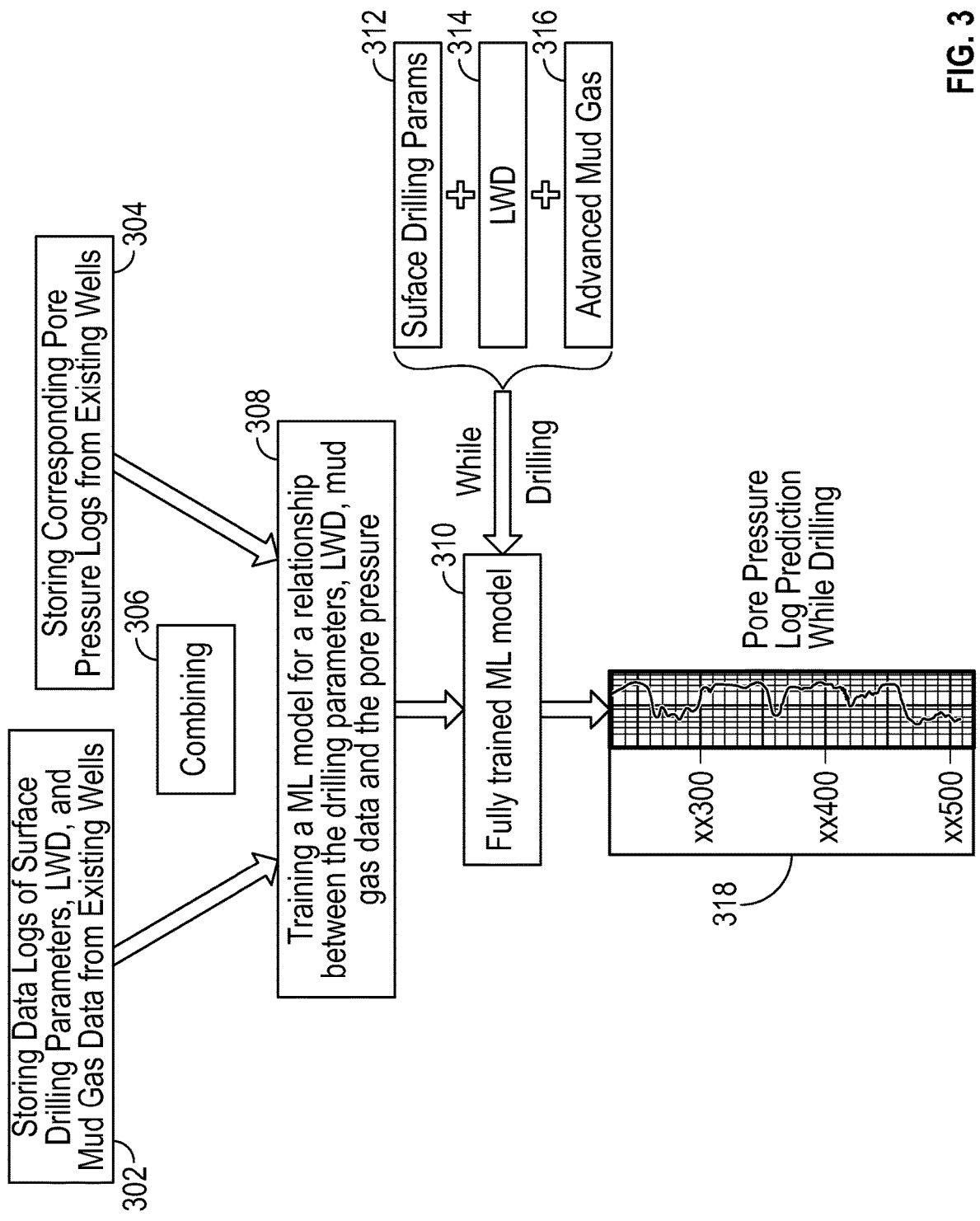
FIGS. 3-4 illustrate flow charts detailing the steps for determining a pore pressure log of a well in a reservoir according to one or more embodiments.

FIG. 3 illustrates a flow chart of the method steps for determining a pore pressure log of a well in a reservoir according to one or more embodiments. The method for determining the pore pressures of a reservoir comprises the following steps.

In step 302, existing data logs of surface drilling parameters, LWD, and mud gas of existing wells are stored in a database. In step 304, existing data logs of pore pressures (existing pore pressure logs) of the existing wells are stored in the database. The existing pore pressure logs correspond to the existing data logs. In step 306, the existing data logs are combined with the existing pore pressure logs. The combining is such that the data of a data log at a certain depth of the well corresponds to the pore pressure at the same depth. In step 308, a ML model comprising a nonlinear relationship (activation function $f$) between the existing data logs and the existing pore pressure logs is trained. In step 310, a fully trained ML model is established.

In step 312, a newly obtained data log of the surface drilling parameters of a new well being drilled are inputted to the fully trained ML model. In one or more embodiments, the new well is drilled into the reservoir where the training data subset was obtained. In other embodiments, the new well is drilled into a new reservoir different than the reservoir where the training data subset was obtained.

In step 314, a newly obtained log of LWD of the new well being drilled is inputted to the fully trained ML model. In step 316, a newly obtained data log of the mud gas of the new well being drilled is inputted to the fully trained ML model. In step 318, the fully trained ML model outputs a real-time pore pressure log for the well being drilled. The steps of generating the estimated real-time pore pressure log by the ML model is described in FIG. 4.

Figure 4:
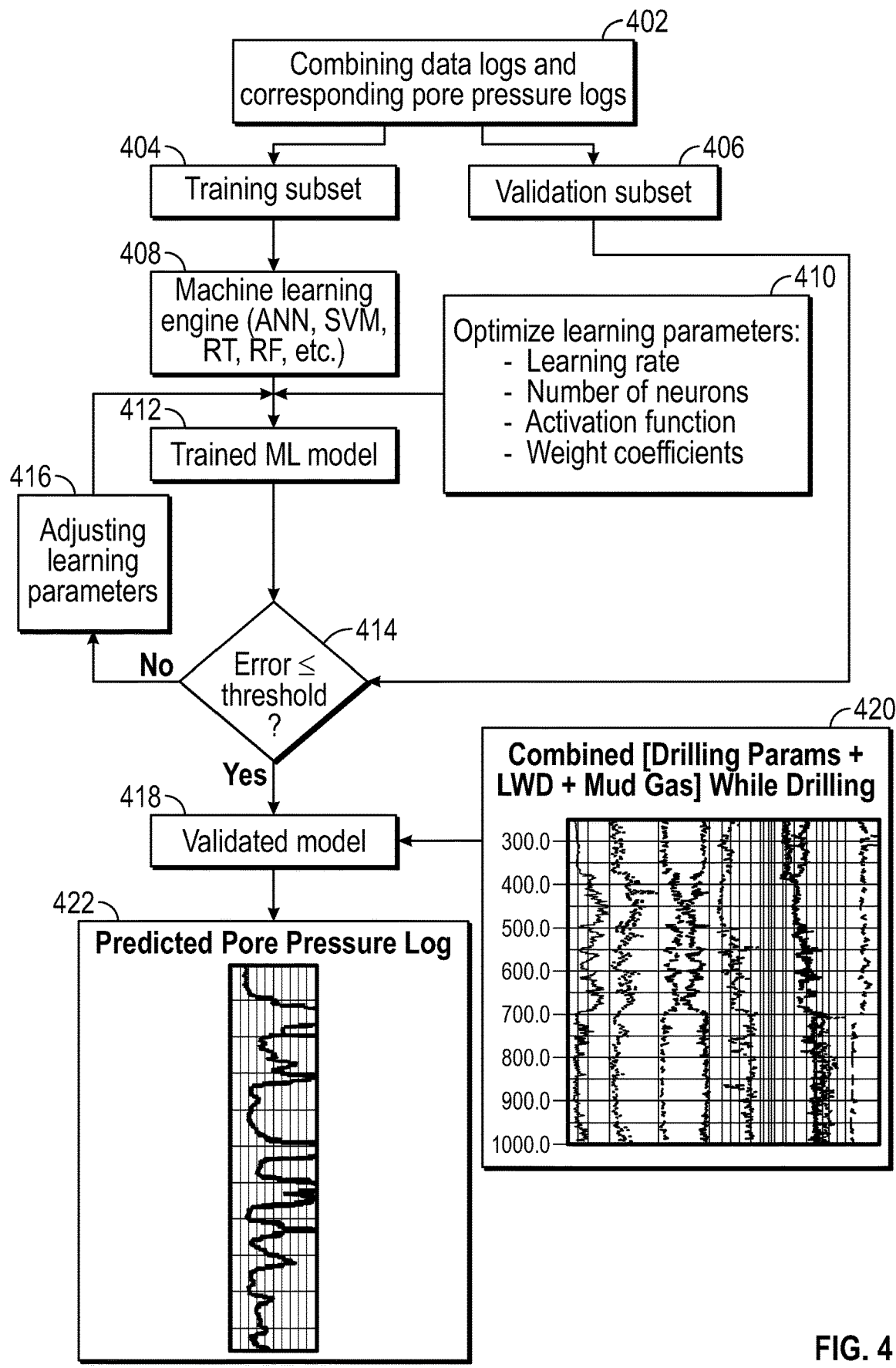

FIG. 4 illustrates another flow chart of the method steps for determining a pore pressure log of a well in a reservoir, according to one or more embodiments.

In step 402, existing data logs from 50 existing wells are stacked to form a single dataset with all the columns aligned, with existing pore pressure logs from the 50 existing wells, such that the existing pore pressure logs correspond to the existing data logs.

In one or more embodiments, the existing data logs and existing pore pressure logs from more than 50 existing wells are combined. The combined data provides more information that improves the accuracy of the estimated pore pressure when estimated with a ML model.

In step 404, a training data subset is extracted from the combination of the existing data logs and the existing pore pressure logs. The training data subset comprises the existing data logs only.

In step 406, a validation data subset is extracted from the combination of the existing data logs and the existing pore pressure logs. The validation data subset comprises only the existing pore pressure logs that correspond to the existing data logs of the training data subset.

In step 408, the training data subset of the existing data logs is inputted into a ML engine to build and optimize a ML model. In one or more embodiments, the ML model uses an artificial neural network (ANN), Support Vector Machine (SVM), Regression Tree (RT), Decision Tree (DT), Random Forest (RF), Multivariate Linear Regression (MLR), Extreme Learning Machine (ELM), or Type I and Type II Fuzzy Logic (T1FL/T2FL).

In step 410, the learning parameters of the ML model are optimized. The learning parameters comprise number of layers, learning rate, activation function, and weighting factors.

In one or more embodiments, the ANN comprises hidden layers between the input and output layer. The number of the hidden layers depend on the volume and complexity of the existing data logs. The learning parameters further comprise the number of neurons in the hidden layer(s).

The learning parameters are used to tune the nonlinear relationship (activation function $f$) to the training data subset of the existing data logs. To validate the performance of the trained model, the actual pore pressure in the validation dataset is hidden and only input parameters are revealed. Then, the input part of the validation dataset is passed to the ML model while keeping the pore pressure hidden. Then, the predicted pore pressure is compared with the hidden actual pore pressure. In contrast, the training process requires both the input and the target pore pressure.

The ML model estimates the pore pressure logs corresponding to the training data subset of the existing data logs inputted to the ML model. The estimated pore pressures are then compared to the existing pore pressures from the validation data subset kept hidden from the model.

In step 412, the ML engine determines a trained ML model using the optimized learning parameters.

For the further discussion, it is assumed that the ML engine uses an ANN as described in the description of FIG. 2. The ANN trains itself by determining the difference between the estimated pore pressure and an existing pore pressure from the validation data subset. The difference between the estimated pore pressure and the existing pore pressure is the error.

In step 414, an error between the estimated pore pressures and the existing pore pressures from the validation data subset is determined. The ANN uses the error to adjust the weighting factors. The adjustment of the he weighting factors causes the ANN to estimate a pore pressure that is increasingly similar to the existing pore pressure. After a sufficient number of the adjustments the training is terminated.

Backpropagation is used to adjust the weighting factors of each neuron to compensate for each error found during the training. The ANN comprises a Bayesian network to train the backpropagation.

The Bayesian network comprises nodes representing variables. Each node comprises a probability function. A particular set of values is inputted to the probability function which outputs the probability of the variable represented by the node.

The ANN further comprises a Levenberg-Marquardt algorithm (LMA) to train the backpropagation. The LMA solves non-linear least squares problems arising especially in least squares curve fitting.

In case the error is not within the pre-set threshold, the learning parameters are readjusted, and the training of the ML model is repeated in step 416. The training of the ML model goes on until the error is within the threshold. The optimization comprises adjusting the learning parameters until the error is kept within the threshold.

Matching the estimated pore pressure of the ML model with the existing pore pressures from the validation data subset is called the feed-forward process. The process of readjusting the parameters of the ML model to increase the match and reduce the error between the estimation of the ML model and the existing pore pressure logs from the validation data subset is called backpropagation.

It should be noted that the feed-forward and backpropagation have the capability to remove the bias embedded in the existing pore pressures. This iteration continues until the error comes within the threshold or the maximum number of iterations is reached. The best ML model achieved up to that point is used for the estimation of the ore pressure.

Once the error is within the threshold, the ML model is trained and ready for real-time estimation of pore pressure logs in a zone of interest or a zone of data coverage of a new well while drilling is still in progress.

In step 418, the validated ML model uses the new real-time data logs as input and generates a new real-time pore pressure log with the same depth interval or at the same resolution as the inputted real-time data logs.

In one or more embodiments, the ML model is recalibrated. Once a new well is drilled, the new data logs and their corresponding new pore pressure log are used to further train the ML model. With the updated trained ML model, the same set of learning parameters is not sufficient anymore to fit the ML model to the newly updated data. Hence, new sets of the learning parameters are derived to establish a good relationship between the updated combined data and the new set of pore pressure logs.

In step 420, a combination of new data logs from a new well are inputted to the validated ML model of the ML engine, while drilling the new well.

In step 422, the validated ML model outputs an estimated pore pressure log of the new well. At any time during the drilling of the new well, the outputted estimated pore pressure log is analyzed to determine underpressure and overpressure.

Results obtained from similar approach successfully applied to the estimation of porosity and hydrocarbon volume fraction are shown in FIGS. 5a, 5b, 6a, and 6b.

FIG. 5a illustrates a first pair of data logs of porosity derived from mud gas. A first plot is the porosity estimated by the ML model trained by a real-time dataset and a second plot is the existing measured porosity of the dataset. The ML model used SVM to estimate the porosity as a function of depth. The porosity varies between 0 and 0.4 in a depth between 9000 and 18000 ft. As can be seen from FIG. 4a, the error between the estimated porosity and the existing measured porosity is within the pre-set threshold.

FIG. 5b illustrates a second pair of data logs of porosity derived from mud gas. As can be seen from FIG. 4a, the error between the estimated porosity and the existing measured porosity is also within the pre-set threshold.

Figure 6A:
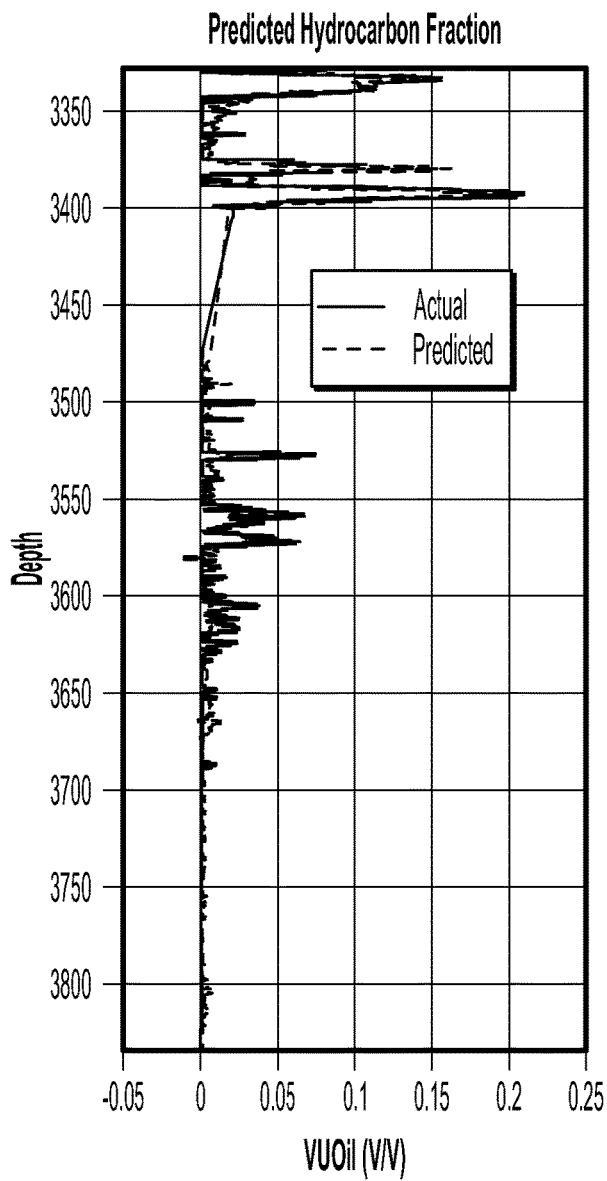
FIG. 6a illustrates a first pair of data logs of hydrocarbon volume fraction from mud gas.

FIG. 6a illustrates a first pair of data logs of hydrocarbon volume fraction from mud gas. A hydrocarbon is an organic compound consisting entirely of hydrogen and carbon. The hydrocarbon volume fraction is the ratio of the hydrocarbon volumetric flow rate to the total volumetric flow rate of all fluids.

A first plot is a training plot for real-time hydrocarbon volume fraction estimation. A second plot is a measured hydrocarbon volume fraction. As can be seen from FIG. 5a, the error between the estimated hydrocarbon volume fraction and the existing measured hydrocarbon volume fraction is within the pre-set threshold.

Figure 6B:
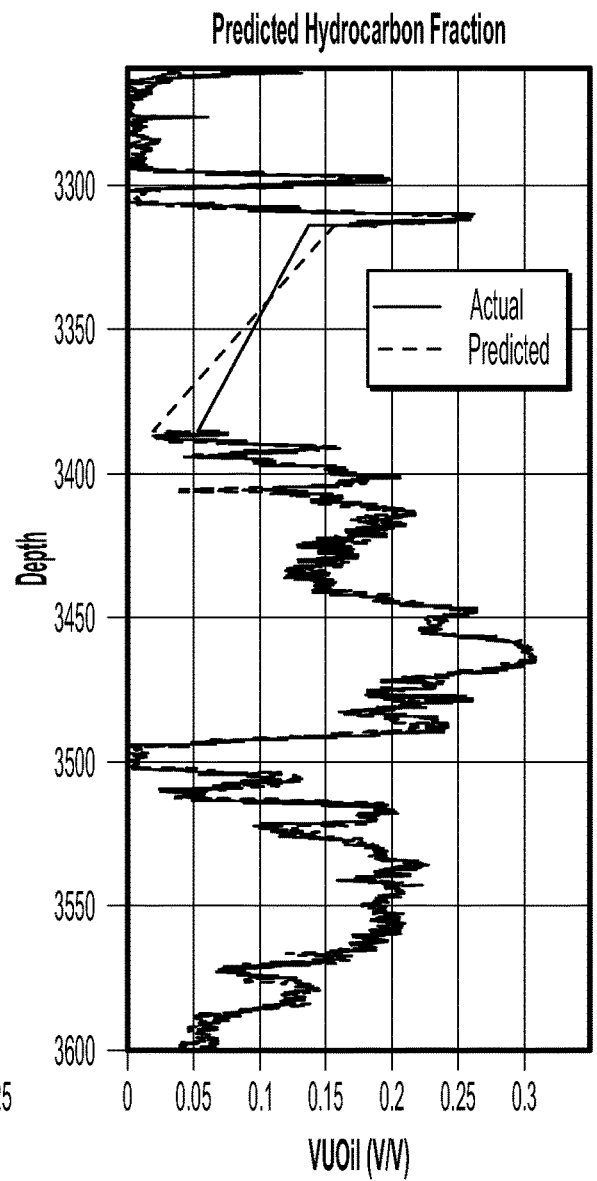
FIG. 6b illustrates a second pair of data logs of hydrocarbon volume fraction from mud gas.

FIG. 6b illustrates a second pair of data logs of hydrocarbon volume fraction from mud gas. As can be seen from FIG. 5b, the error between the estimated hydrocarbon volume fraction and the existing measured hydrocarbon volume fraction is also within the pre-set threshold.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A method for determining a real-time pore pressure log of a well in a reservoir, comprising the steps:
    storing existing data logs, which includes surface drilling parameters, data obtained from logging while drilling (LWD), and mud gas data, of existing wells in a database, wherein the mud gas data comprises chemical composition of a mud gas mixed with a drilling mud,
    storing existing pore pressure logs of the existing wells in the database, wherein the existing pore pressure logs correspond to the existing data logs,
    determining a relationship between the existing data logs and the existing pore pressure logs,
    drilling a new well into the reservoir,
    determining new data logs, which includes surface drilling parameters, data obtained from LWD, and mud gas data, of the new well while drilling the new well,
    inputting the chemical composition of the mud gas together with the LWD data and the surface drilling parameters from the new data logs of the new well into the relationship to output an estimated pore pressure while drilling the new well,
    determining a real-time pore pressure log of the new well by outputting the estimated pore pressure at a certain depth by the relationship while drilling the new well, and
    adjusting dynamically, using the real-time pore pressure log, a weight on a drill bit and properties of the drilling mud during the drilling of the new well.

2. The method according to claim 1, wherein the surface drilling parameters comprise:
    rate of penetration (ROP) of the drill bit, weight on the drill bit (WOB), torque of the drill bit, revolutions per minute (RPM) of the drill bit, hook load, mud flow rate, D-Exponent, mud density, standpipe pressure, mud temperature.

3. The method according to claim 1, wherein the relationship is determined by using a machine learning (ML) model.

4. The method according to claim 3, wherein the ML model uses an Artificial Neural Network (ANN), Support Vector Machine (SVM), Regression Tree (RT), Random Forest (RF), Extreme Learning Machine (ELM), or Type I or Type II Fuzzy Logic (T1FL/T2FL).

5. The method according to claim 3, wherein the ML model uses an Artificial Neural Network (ANN).

6. The method according to claim 5, wherein the ANN comprises a summation layer that uses a linear function for backpropagation.

7. The method according to claim 5, wherein the ANN comprises a Bayesian network to train a backpropagation.

8. The method according to claim 5, wherein the ANN uses a Levenberg-Marquardt algorithm to train a backpropagation.

9. The method according to claim 1, wherein the relationship comprises an activation function $f$ that is a sigmoid function.

10. The method according to claim 1, wherein the relationship comprises an activation function $f$ for estimating a pore pressure PP is a nonlinear function $PP=f(a_1X_1+a_2X_2+\ldots+a_6X_6)$, where $a_1, a_2, \ldots a_6$ are weighting factors of the ANN and $X_1, X_2, \ldots X_6$ are the existing data logs.

11. The method according to claim 1, wherein the new data log of the mud gas of the new well is determined by the steps:
    inserting mud into the new well while drilling the new well until the mud is mixed with gasses from the new well to a mud gas and the mud gas flows out of the new well,
    separating gas from the mud gas flowing out of the new well,
    determining the new data log of the mud gas by analyzing the gas.

12. The method according to claim 1, wherein the data logs are stored for at least 50 existing wells.

13. The method according to claim 1, wherein the new data logs of the new well and the corresponding new pore pressure logs of the new well are used to optimize the relationship.

14. The method according to claim 5, wherein the ANN is trained comprising the following steps:
    determining an error log between the estimated pore pressure log and the existing pore pressure log,
    using the error log to adjust the ML model of the ANN.

15. The method according to claim 14, wherein the ANN uses an activation function to determine a weighting factor, and the error log is used to adjust the weighting factor.

16. The method according to claim 1, wherein the LWD data comprises sound, gamma, and neutron ray emissions.

17. The method according to claim 16, wherein the LWD data comprise gamma ray, sonic, resistivity, and neutron porosity.

18. A ML engine, comprising:
    a ML algorithm software component comprising instructions to perform a plurality of steps, the plurality of steps comprising:
        storing existing data logs, which includes surface drilling parameters, data obtained from logging while drilling (LWD), and mud gas data of existing wells in a database, wherein the mud gas data comprises chemical composition of a mud gas mixed with a drilling mud, storing existing pore pressure logs of the existing wells in the database, wherein the existing pore pressure logs correspond to the existing data logs, determining a relationship between the existing data logs and the existing pore pressure logs, drilling a new well into the reservoir, determining new data logs, which includes surface drilling parameters, data obtained from LWD, and mud gas data of the new well while drilling the new well, inputting the chemical composition of the mud gas together with the LWD data and the surface drilling parameters from the new data logs of the new well into the relationship to output an estimated pore pressure while drilling the new well, determining a real-time pore pressure log of the new well by outputting the estimated pore pressure at a certain depth by the relationship while drilling the new well; and adjusting dynamically, using the real-time pore pressure log, a weight on a drill bit and properties of the drilling mud during the drilling of the new well, a database for storing the existing data logs and the existing pore pressure logs, and a processor for performing the plurality of steps by executing the instructions of the ML algorithm software component.

* * * * *